US006996323B2

(12) United States Patent
Scarth et al.

(10) Patent No.: US 6,996,323 B2
(45) Date of Patent: Feb. 7, 2006

(54) METHOD AND SYSTEM FOR OPERATING A PLURALITY OF ELECTRONIC VARIABLE OPTICAL ATTENUATORS (EVOAS)

(75) Inventors: Gordon Bruce Scarth, Ottawa (CA); Robert Michael Bierman, Ottawa (CA); Paul David Obeda, Ottawa (CA); Omayma Moharram, Carleton Place (CA); Victoria Donnelly, Ottawa (CA)

(73) Assignee: Tropic Networks Inc., Kanata (CA)

( * ) Notice: Subject to any disclaimer, the term of this patent is extended or adjusted under 35 U.S.C. 154(b) by 265 days.

(21) Appl. No.: 10/618,582

(22) Filed: Jul. 15, 2003

(65) Prior Publication Data

US 2004/0109662 A1    Jun. 10, 2004

Related U.S. Application Data

(60) Provisional application No. 60/441,480, filed on Jan. 22, 2003, provisional application No. 60/430,972, filed on Dec. 5, 2002.

(51) Int. Cl.
*G02B 6/00* (2006.01)
(52) U.S. Cl. .......................................... 385/140; 398/38
(58) Field of Classification Search ............... 385/140; 398/38
See application file for complete search history.

(56) References Cited

U.S. PATENT DOCUMENTS

| 6,207,949 B1 | 3/2001 | Jackel |
| 6,304,347 B1 | 10/2001 | Beine et al. |
| 6,600,594 B1 * | 7/2003 | Ko et al. ..................... 359/337 |

* cited by examiner

*Primary Examiner*—Sung Pak

(74) *Attorney, Agent, or Firm*—Victoria Donnelly

(57) ABSTRACT

A system and method for operating a plurality of eVOAs in an optical network is provided. The system comprises a number of eVOAs, each eVOA coupled to one or more optical taps and connected to a microcontroller. The microcontroller comprises a monitor signal processing controller for measuring the power of the optical signal at the eVOAs; a scheduler for continuously cycling and checking the eVOAs operating attenuations; a microprocessing controller for determining, setting, adjusting and updating the eVOA operating attenuation and a means for communications between the microprocessor and the other controller within the system. The microcontroller cycles through the plurality of eVOAs and controls one eVOA at a time according to a predetermined method of the eVOA operation. Individual eVOAs may be controlled according to the same or different methods of controlling operations thereof as required.

10 Claims, 9 Drawing Sheets

METHOD AND SYSTEM FOR OPERATING A PLURALITY OF ELECTRONIC VARIABLE OPTICAL ATTENUATORS (EVOAS)

RELATED APPLICATIONS

This application claims benefit from U.S. Provisional Patent Application Ser. No. 60/430,972 to Bierman, R. M., entitled "Method and Apparatus for Power Control in an Optical System", filed on 5 Dec. 2002;

This application also claims benefit from U.S. Provisional Patent Application Ser. No. 60/441,480 to Scarth, G. B., et al, entitled "Operating eVOA by Modulating its Attenuation", filed on 22 Jan. 2003;

This application is related to and also claims benefit from U.S. patent application Ser. No. 10/440,247 to Bierman, R. M., entitled "Method and Apparatus for Controlling a Variable Optical Attenuator in an Optical Network", filed on 19 May 2003; and This application is also related to and also claims benefit from a U.S. patent application to Scarth, G. B., et al, entitled "Method and Apparatus for Operating Variable Optical Attenuator by Modulating the Attenuation Thereof", and filed concurrently herewith.

FIELD OF THE INVENTION

This invention relates generally to optical telecommunications networks and, in particular, to a method and system for operating a plurality of electronic variable optical attenuators (eVOAs).

BACKGROUND OF THE INVENTION

Components vendors and providers of wavelengths division multiplexing (WDM) optical systems are under great pressure to provide cost relief by developing ways to reduce capital and operating expenditures. Capital expenditure savings can be achieved, e.g. through overall reduction in optical components and associated costs. The operating expenditure savings can be achieved by developing components that are simpler and easier to maintain, requires fewer repairs, take up less space and consume less power.

In WDM network electronically controlled variable optical attenuators (eVOAs) are widely used to control optical signal power. The eVOAs are deployed either before and/or after lasers to attenuate an incoming and transmitted light to compensate for laser power drift and to prevent oversaturation at the receiver end. When wavelengths are added, dropped or routed in an optical network, an eVOA inserted in the optical signal path can manage the optical power fluctuations of the processed signal. As the number of channels to be monitored in the network increases, it drives the significant changes in eVOAs requirements that include the need for multiple eVOAs, the need for electronic control and the need for speed.

FIG. 1 shows a prior art arrangement including a plurality of eVOAs 120, 125, 130, 135, 140, 145, 150 and 155, and optical tap couplers and tap monitors 101 to 116. Each of the channels (wavelengths) 181 to 188, has an optical tap coupler and tap monitors that leads the eVOAs and another optical tap couples and tap monitor that follows said eVOAs, e.g. optical coupler and tap monitors 101 to 108 lead the eVOAs 120 to 155 respectively, and optical coupler and tap monitors 109 to 116 follow said eVOAs.

FIG. 2 shows a prior art optical system 200 including the arrangement of the plurality of eVOAs of FIG. 1. The optical system 200 can be, for example, an optical add/drop multiplexer or part thereof, a cross-connect optical add/drop node or an optical switching system. Referring to FIG. 2, a plurality of optical tap couplers and tap monitors 201 to 208 respectively lead multiple eVOAs 220, 225, 230, 235, 240, 245, 250 and 255, and another plurality of optical tap couplers and tap monitors 209 to 216 follow said eVOAs. A WDM optical signal input 280 is received by the optical system 200 at a microcontroller 260, and the de-multiplexed wavelengths are fed to the optical tap couplers and tap monitors 201 to 208 for detecting and measuring the optical signal power at the inputs to the eVOAs 220, 225, 230, 235, 240, 245, 250 and 255 respectively. The optical tap couplers and tap monitors 209 to 216 that follow said eVOAs are for detecting and measuring the optical signal power at the outputs of the respective eVOAs. The system 200 shows "n" eVOAs, where "n=8" in FIG. 2, wherein each eVOA requires an individual control circuit (one of the circuits 261 to 268) and an adjustment circuit (one of the circuits 271 to 278), which control each individual eVOA with different attenuation for each of the channels (wavelengths) 281 to 288. The channels (wavelengths) 281 to 288 are then multiplexed by a multiplexer 295 to form a WDM output 290. In the system 200 the Processor 270 communicates with the control and adjustment circuits 261 to 268 and 271 to 278 for individual eVOAs to control the amount of attenuation for their respective output signals.

As the number of channels (wavelengths) in the optical system 200 increases, the number of eVOAs increases and, in turn, the number of eVOA control and adjustment circuits increase, which results in an increased load on the microcontroller 260 to provide appropriate attenuation setting for multiple eVOAs. As a result, the total number of the required components increases, which lead to the increase in the initial installation cost, space and power consumptions of the optical system.

Accordingly, there is a need to provide an improved methods and systems for operating and controlling a plurality eVOAs, which would reduce initial installation cost, consume less power and occupy less space, while ensuring efficient attenuation of optical signals in an optical network and provide adequate protection of optical equipment in the network.

SUMMARY OF THE INVENTION

It is an object of the present invention to provide a system and methods for operating and multiple eVOAs in an optical network, which would reduce or obviate the shortcomings of the prior art.

According to one aspect of the invention there is provided a system for operating a plurality of electronic variable optical attenuators (eVOAs), comprising a microcontroller connected to the plurality of eVOAs, the microcontroller having means for selecting one eVOA from the plurality of the eVOAs at a time and operating the selected eVOA according to a predetermined method of controlling the selected eVOA within a time slice allocated for the selected eVOA.

The means for selecting and operating further comprises a scheduler having a clock for generating the allocated time slice $\{\tau\}$ for monitoring and controlling the selected eVOA; a processor for calculating the attenuation of the selected eVOA according to the predetermined method of controlling the selected eVOA during the allocated time slice; a monitor signal processing controller for measuring power of an optical signal at the selected eVOA; a microprocessing controller for changing an operating attenuation of the selected eVOA in response to a signal received from the processor; and a means for providing communications between the processor, the monitor signal processing controller, the scheduler and the microprocessing controller.

The monitor signal processing controller for measuring power of an optical signal at the selected eVOA comprises one of the following: a means for measuring the optical signal power at an input to an eVOA; a means for measuring the optical signal power at an output of an eVOA; and a means for measuring the optical signal power at an input to an eVOA and at an output of an eVOA.

The scheduler comprises a means for electronically cycling and scanning the plurality of eVOAs within a response time "T" of the microcontroller, wherein T=n*τ, "n" is the number of eVOAs, and τ is the time slice for actively monitoring and controlling each eVOA. The microprocessing controller comprises a means for determining a required attenuation level and a means for setting the eVOA at said attenuation level. Conveniently, the microprocessing controller further comprises means for adjusting and updating attenuation of the selected eVOA. The system for operating the plurality of eVOAs as described above may be incorporated in another optical system or device for use in an optical network.

According to another aspect of the invention there is provided a method for operating a plurality of eVOAs inserted in optical paths of optical signals propagating in an optical network, comprising the steps of:

(a) selecting an eVOA from the plurality of eVOAs;

(b) operating the selected eVOA according to a predetermined method of controlling said eVOA within a time slice allocated for the selected eVOA; and (c) repeating the steps (a) to (b) until all eVOAs from the plurality of the eVOAs have been selected; and (d) repeating the steps (a) to (c) as required.

The step of selecting the eVOA from the plurality of eVOAs comprises continuously cycling through the eVOAs, e.g. cycling through the eVOA in a prescribed order or cycling through the eVOAs in a random order.

The step of operating the selected eVOA comprises measuring an optical signal power of the optical signal at the selected eVOA, which may include one of the following: measuring the optical signal power at an input to the selected eVOA; measuring the optical signal power at an output of the selected eVOA; and measuring the optical signal power at an input to the selected eVOA and at an output of the selected eVOA.

In one of the embodiments of the invention, the step of operating the selected eVOA comprises: setting attenuation of the selected eVOA to a pre-determined fixed value, which is less than a minimum attenuation for the selected eVOA, if a loss-of-signal (LOS) power condition is detected for the selected eVOA; setting said eVOA attenuation to a pre-determined fixed value, which is less than said minimum attenuation, if the measured power {Pmeas} is greater than a target power {Ptarget} for the selected eVOA; and setting attenuation of the selected eVOA to a pre-determined fixed value, which is less than said minimum attenuation, if the measured power {Pmeas} is less than the target power {Ptarget} for the selected eVOA.

The step of continuously cycling through the eVOAs comprises the step of scanning the plurality of eVOAs in a specified time period "T", wherein T=n·τ, "n" is the number of eVOAs, and τ is the time slice for controlling each eVOA.

In another embodiment of the invention, the step of operating the selected eVOA comprises changing the attenuation of said eVOA in one or more variable size intervals (VSI) so that the power of the optical signal substantially equals to the target power {Ptarget}, the size of the variable interval being a function of the {Pmeas} and {Ptarget}, if the measured optical signal power {Pmeas} differs from a target power {Ptarget} for the selected eVOA.

The step of changing the attenuation of said eVOA in one or more variable size intervals (VSI) may comprise changing the attenuation of said eVOA in intervals, whose size in a linear function or a non-liner function of the {Pmeas} and {Ptarget}.

In the method of operating the plurality of eVOAs according to yet another embodiment of the invention the step of operating the selected eVOA comprises: measuring the optical signal power at the output of the selected eVOA; and, if the optical signal power is below a loss of signal (LOS) power threshold, then setting the attenuation of the selected eVOA to a maximum attenuation (MaxAtt) and modulating the attenuation said eVOA by decreasing and increasing the eVOA attenuation in finite steps until the optical power is detected above the LOS power threshold or the maximum attenuation (MaxAtt) is reached.

The step of selecting the eVOA comprises continuously cycling through the eVOA in a specified time period "τ", wherein T=n·τ, "n" is the number of eVOAs, τ is the time slice for controlling each eVOA; and further comprises taking time "$T_s$" for each finite step such that $S·T_s<T$, wherein "S" is the maximum number of finite steps. Beneficially, the step of modulating the eVOA attenuation in finite steps comprises determining a maximum number of steps "S" for decreasing and increasing the attenuation, an attenuation value per step "$A_s$", and a predefined protection attenuation (PPA). The step of modulating the eVOA attenuation in finite steps further comprises: selecting a stepping down step size for decreasing the eVOA attenuation by $A_s$ such that $\{MaxAtt-PPA\}<S·A_s$; and selecting a stepping up step size for increasing the eVOA attenuation by $A_s$ such that $\{S·A_s+PPA\}<MaxAtt$.

The embodiments of the invention provide the following advantages. The systems for operating multiple eVOAs of the embodiments of the invention require less hardware compared to the prior art solutions, and as a result reduce power consumption, occupy less space and simplify initial installation and maintenance of the eVOAs. The methods of operating the plurality of eVOAs reduce or eliminate risks of power spikes in the network and provide accurate and speedy adjustments of the eVOAs attenuations.

BRIEF DESCRIPTION OF THE DRAWINGS

The invention will be better understood from the following description of the preferred embodiments together with reference to the accompanying drawing, in which.

DESCRIPTION OF THE PREFERRED EMBODIMENTS

Figure 1:
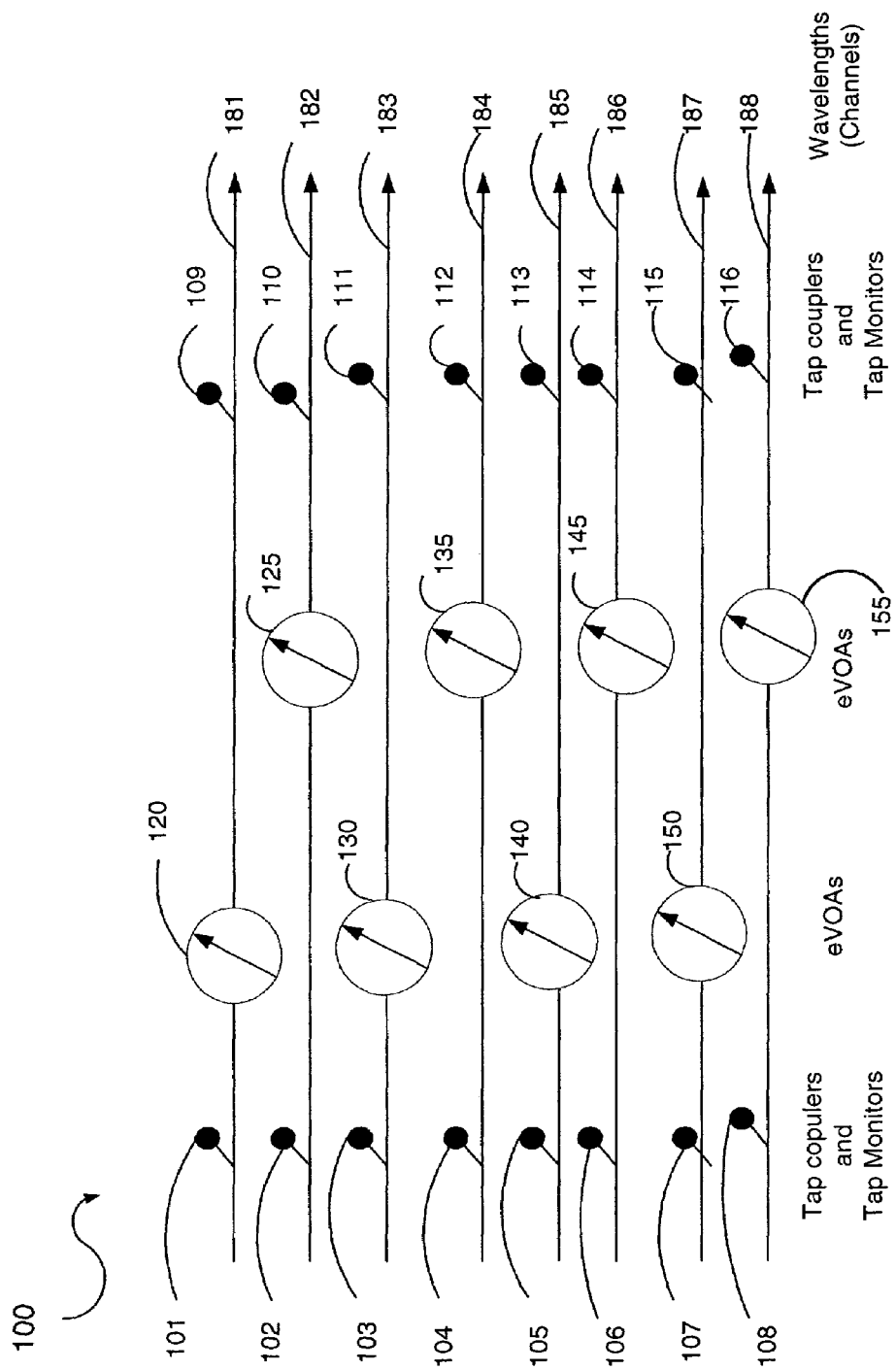
FIG. 1 is a diagram illustrating a prior art arrangement including a plurality of eVOAs.
Figure 2:
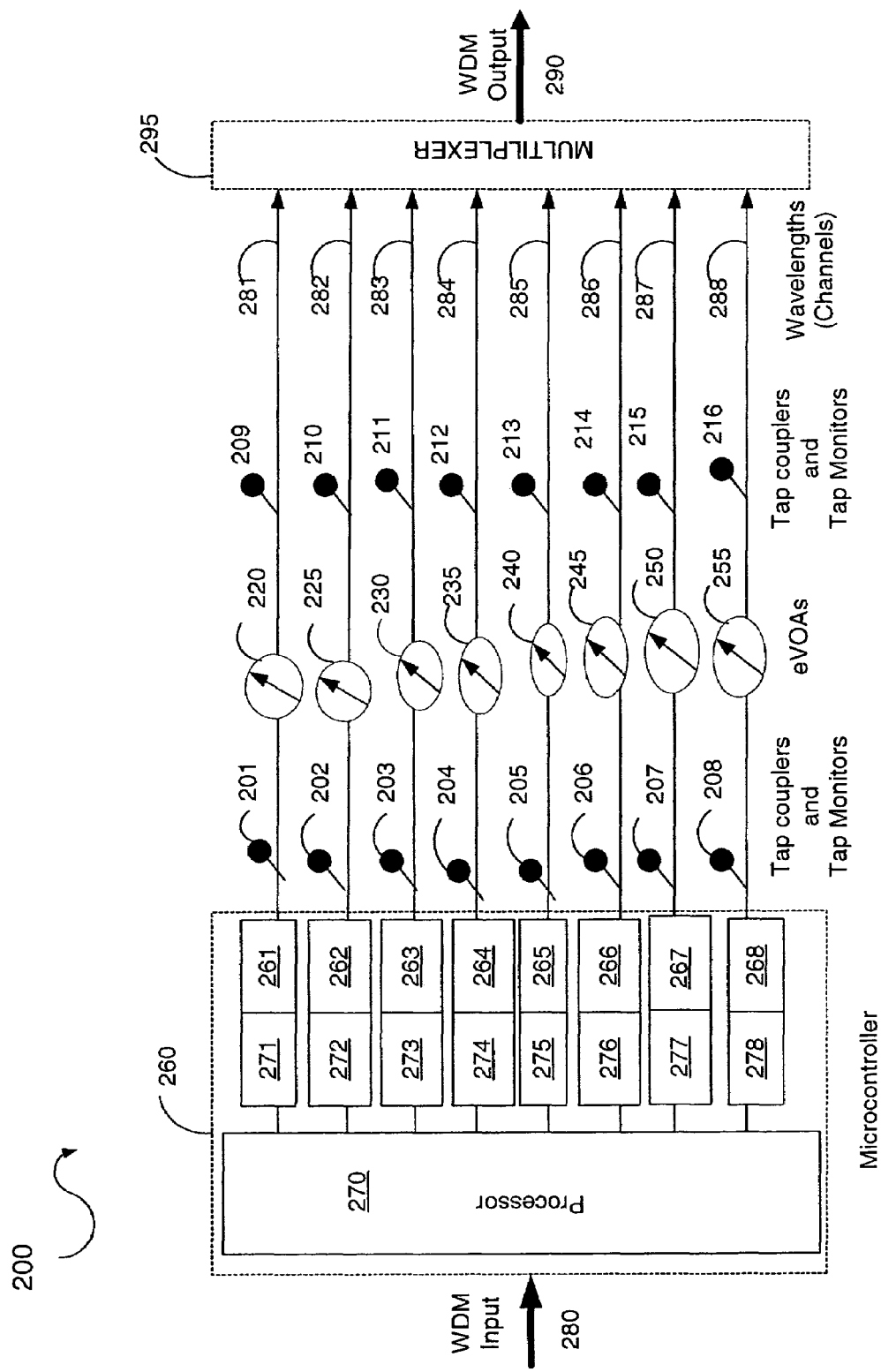
FIG. 2 is a diagram for a prior art integrating the multiple eVOAs arrangement of FIG. 1 with an optical system in a WDM network.
Figure 3:
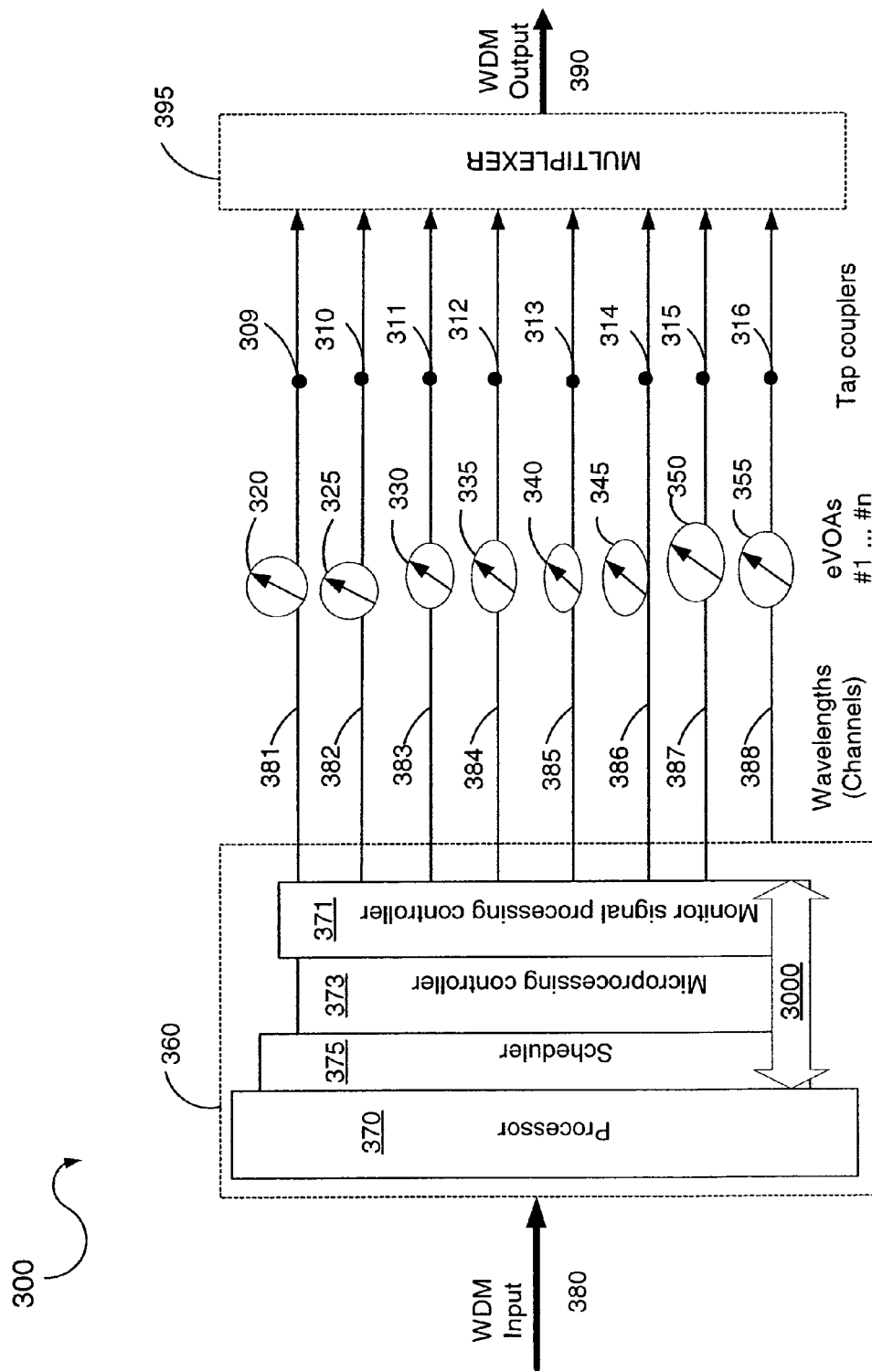
FIG. 3 is a diagram illustrating a system for operating a plurality of eVOAs in accordance with the embodiments of the invention.

FIG. 3 shows a system 300 for controlling multiple electronically controlled variable optical attenuators (eVOAs) 320, 325, 330, 335, 340, 345, 350 and 355, wherein a plurality of optical tap couplers 309 to 316 follow the eVOAs #1 to #n designated by reference numerals 320, 325, 330, 335, 340, 345, 350 and 355 respectively. A WDM optical signal input 380 is fed to the optical system 300 including a microcontroller 360, and the de-multiplexed wavelengths 381 to 388 are fed to the eVOAs 320, 325, 330, 335, 340, 345, 350 and 355 respectively. The outputs from the eVOAs 320 to 355 are fed to a plurality of optical tap couplers 309 to 316 for detecting the optical signal power at the output of the eVOAs 320, 325, 330, 335, 340, 345, 350 and 355 respectively. The eVOAs 320, 325, 330, 335, 340, 345, 350 and 355, and optical tap couplers 309 to 316 are inserted in the path of incoming optical signals of a plurality of channels (wavelengths) 381 to 388. The optical tap couplers 309 to 316 are calibrated so as to accurately report the output signals powers 381 to 388. This is done during the manufacturing process by placing an optical power meter at the optical signal output of each eVOA and recording the photodetector response versus power. The LOS power threshold is calibrated during commissioning of the installed optical system to meet the requirements of the optical network. The microcontroller 360 comprises a monitor signal processing controller 371, a scheduler 375, a microprocessing controller 373 and a processor (control processing unit) 370. The microcontroller 360 further comprises a means for communications 3000 between the processor 370, the scheduler 375, the microprocessing controller 373 and the monitor signal processing controller 371. The outputs of the optical tap couplers 309 to 316 are coupled to the microcontroller 360 (the coupling not shown) to be processed by the monitor processing signal controller 371 for measuring the signal power at the output of the eVOAs. The scheduler 375 provides precise timing for monitoring and controlling process for individual eVOA. The scheduler 375 further comprises means for electronically cycling and scanning the eVOAs and checking their operating attenuations. The microprocessing controller 373 comprises means for determining, setting, adjusting and updating the eVOAs attenuations. The microcontroller 360 incorporates methods for controlling attenuation of multiple eVOAs that are processed by the processor 370. The output channels (wavelengths) 381 to 388 from the tap couplers 309 to 316 are then multiplexed by a multiplexer 395 to form the output WDM 390.

Figure 4:
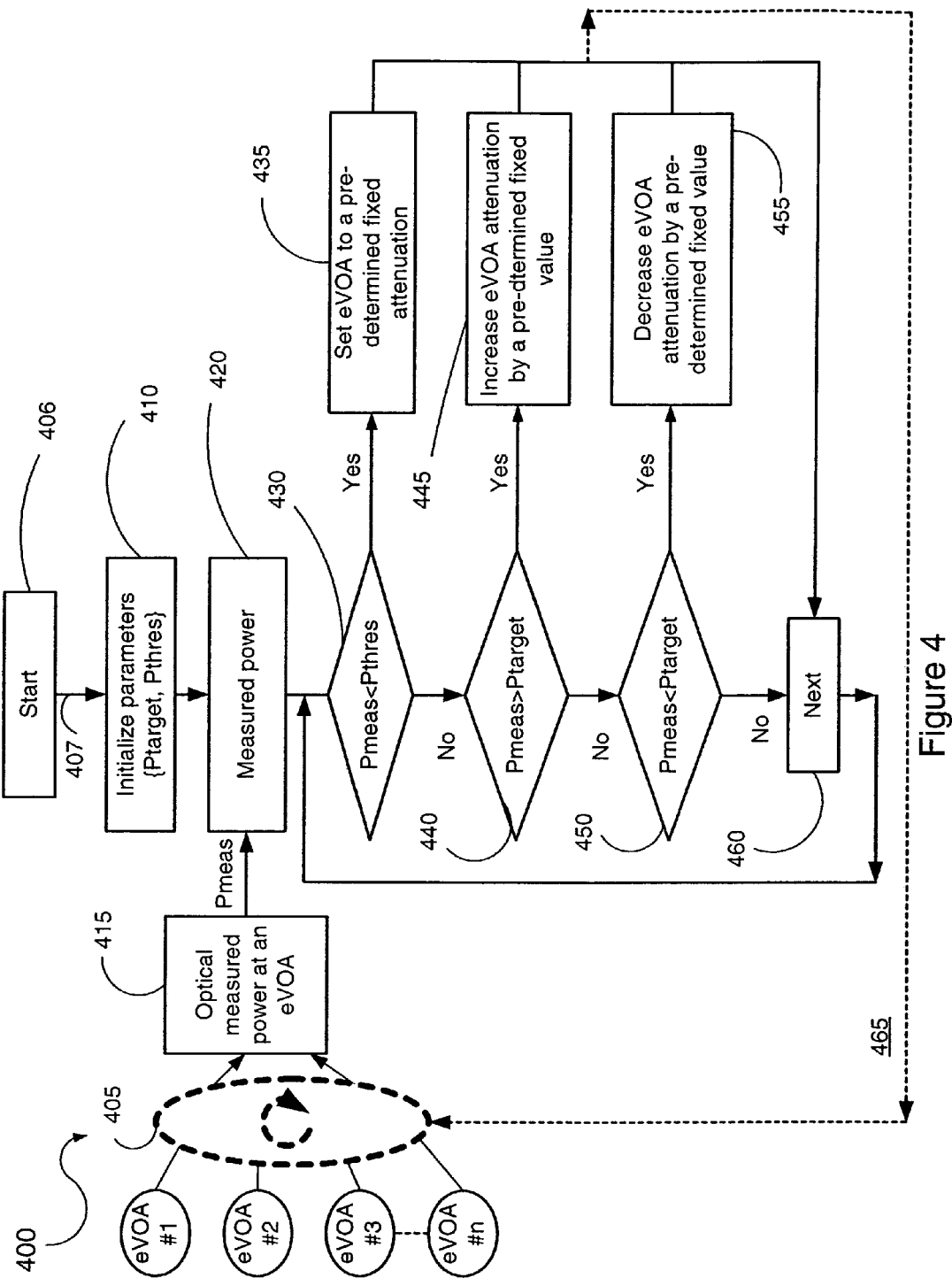
FIG. 4 is a flow diagram illustrating a method for operating a plurality of eVOAs in the system of FIG. 3 in accordance with a first embodiment of the invention.

FIG. 4 shows a flow chart diagram 400 illustrating a method of operating the plurality of eVOAs #1 to #n of FIG. 3 according to the first embodiment of the invention. Upon start up (block 406), routine 407 sets at least one eVOA attenuation to a pre-determined fixed value, which is less than the minimum attenuation, whenever a loss of incoming signal power is detected. The procedure 400 controls one eVOA at a time (block 405). Routine 407 initializes a target power {Ptarget} and LOS power threshold {Pthres} parameters (block 410). The scheduler 375 electronically cycles and scans the eVOAs and checks the eVOAs attenuations. This scanning is performed in a specified time period "T", wherein {T=n·τ}, "T" is the controller response time, "n" is the number of eVOAs (n≧1), and τ is the time slice for actively controlling each eVOA. At each τ, routine 407 uses actual measured power (block 415) at an output of at least one eVOA (block 420) measured by a monitor signal processing controller to adjust said eVOA attenuation setting. If the measured power {Pmeas} is less than LOS power threshold {Pthres} (block 430), routine 407 sets the eVOA attenuation to a pre-determined fixed value of less than the minimum attenuation (block 435) and continues to block 460, where the microprocessing controller sets the eVOA attenuation level to a pre-determined fixed value of less than the minimum attenuation. If the measured power {Pmeas} is greater than the target power {Ptarget} (block 440), routine 407 increases the eVOA attenuation (block 445) by a pre-determined fixed value of less than the minimum attenuation and continues to block 460, where the microprocessing controller sets the eVOA to the new value. If the measured power {Pmeas} is less than target power {Ptarget} (block 450), routine 407 decreases eVOA attenuation (block 455) by a pre-determined fixed value of less than the minimum attenuation and continues to block 460, where microprocessing controller sets the eVOA attenuation to the new value. The above described steps are repeated for each eVOA out of eVOAs #1 to #n via periodic cycling through the eVOAs as illustrated by a dotted line 465 in FIG. 4.

The method of operating the plurality of eVOAs described above may be also applied to certain modifications of the system 300 of FIG. 3 as will be described with regard to FIGS. 5 and 6.

Figure 5:
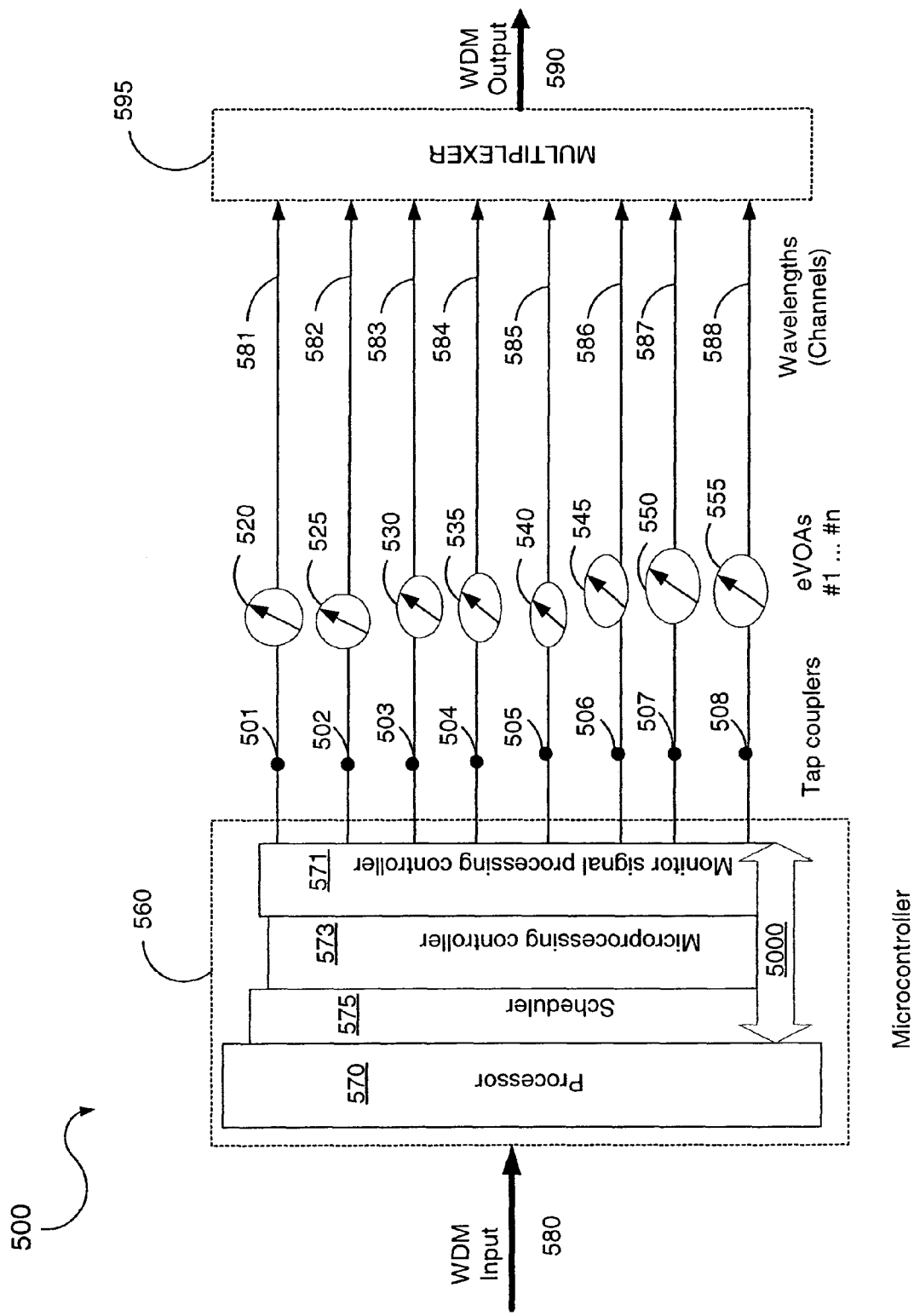
FIG. 5 is a diagram illustrating another system for operating a plurality of eVOAs in accordance with the method of FIG. 4.

Namely, FIG. 5 shows another system 500 for controlling a plurality of eVOAs, wherein a plurality of optical tap couplers 501 to 508 leads the eVOAs (#1 to #n) designated by reference numerals 520, 525, 530, 535, 540, 545, 550 and 555 respectively. A WDM optical signal input 580 is fed to the optical system 500 including a microcontroller 560, and the de-multiplexed wavelengths 581 to 588 are fed to a plurality of optical tap couplers 501 to 508 for detecting the optical signal power at the inputs to the eVOAs 520, 525, 530, 535, 540, 545, 550 and 555 respectively. The outputs from the optical tap couplers 501 to 508 are fed to the eVOAs 520, 525, 530, 535, 540, 545, 550 and 555 respectively. The eVOAs 520, 525, 530, 535, 540, 545, 550 and 555 and optical tap couplers 501 to 508 are inserted in the path of incoming optical signals of a plurality of channels (wavelengths) 581 to 588. Similar to the described above with regard to the system 300 of FIG. 3, the optical tap couplers 501 to 509 are calibrated so as to accurately report the output signals powers 581 to 588, and the LOS power threshold is calibrated during commissioning of the installed optical system to meet the requirements of the optical network. The microcontroller 560 comprises a monitor signal processing controller 571, a scheduler 575, microprocessing controller 573 and a processor (control processing unit) 570. The microcontroller 560 further comprises a means for communications 5000 between the processor 570, the scheduler 575, the microprocessing controller 573 and the monitor signal processing controller 571. The outputs of the optical tap couplers 501 to 508 are coupled to the microcontroller 560 (the coupling not shown) to be processed by the monitor processing signal controller 571 for measuring the signal power at the inputs to the eVOAs. The scheduler 575 provides precise timing for monitoring and controlling process for individual eVOA. The schedule 575 further comprises means for electronically cycling and scanning the eVOAs 520 to 525 and checking their operating attenuations. The microprocessing controller 573 comprises means for determining, setting, adjusting and updating the eVOAs attenuations. The microcontroller 560 incorporates methods for controlling attenuation of multiple eVOAs that are processed by the processor 570. The output channels (wavelengths) 581 to 588 from the eVOAs 520, 525, 530, 535, 540, 545, 550 and 555 are then multiplexed by a multiplexer 595 to form the output WDM 590.

The method of operating the plurality of eVOAs in the system 500 of FIG. 5 is similar to that shown in FIG. 4 above, except for the measured power now being measured at the inputs 501 to 508 to eVOAs #1 to #n respectively.

Figure 6:
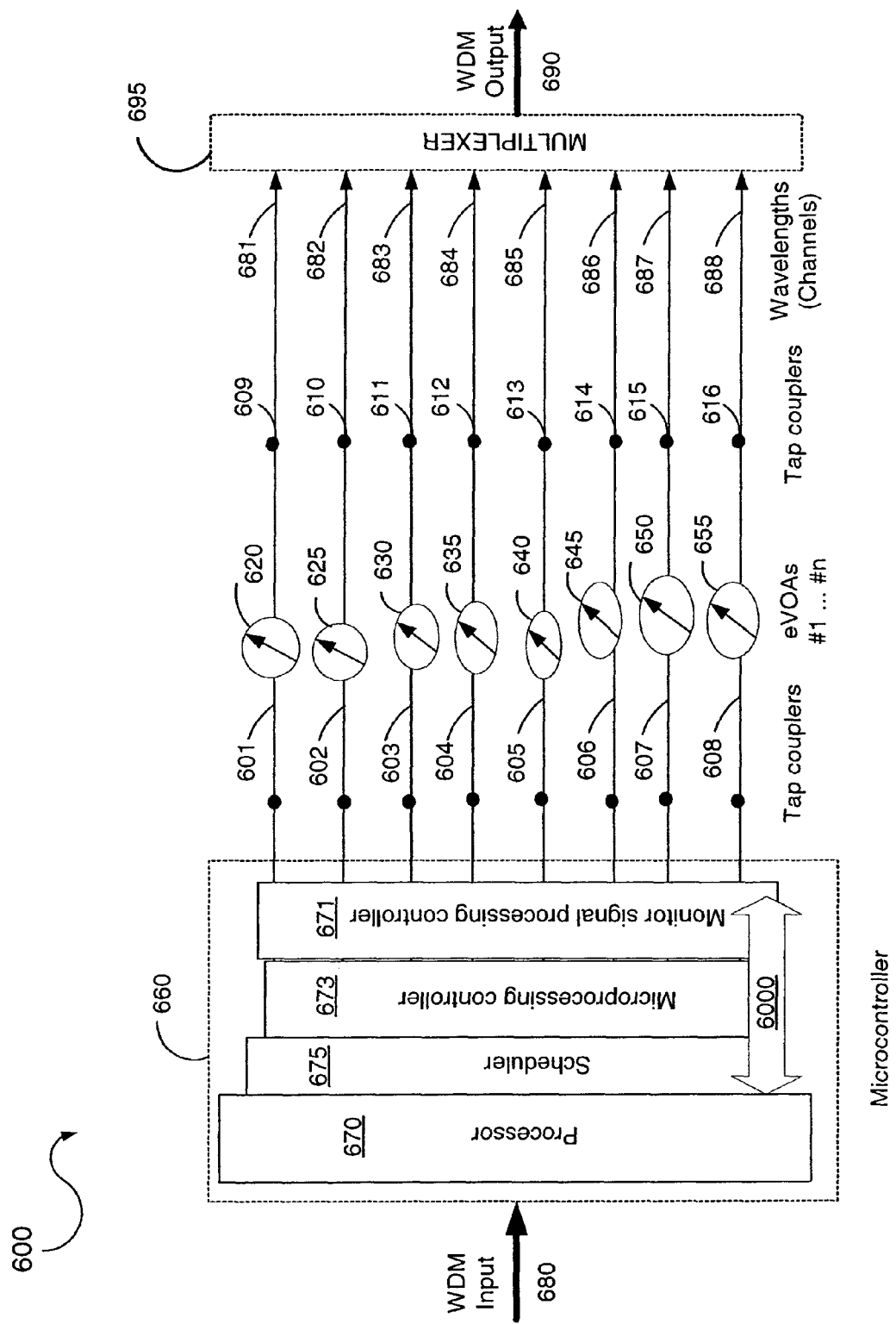
FIG. 6 is a diagram illustrating yet another system for operating a plurality of eVOAs in accordance with the method of FIG. 4.

FIG. 6 shows yet another system 600 for operating a plurality of eVOAs #1 to #n designated by reference numerals 620, 625, 630, 635, 640, 645, 650 and 655, wherein a plurality of optical tap couplers 601 to 608 leads the eVOAs 620, 625, 630, 635, 640, 645, 650 and 655, and another plurality of optical tap couplers 609 to 616 that follows said eVOAs. A WDM optical signal input 680 is fed to the optical system 600 and the de-multiplexed wavelengths 681 to 688 are fed to a plurality of optical tap couplers 601 to 608 for detecting the optical signal power at the inputs to the eVOAs 620, 625, 630, 635, 640, 645, 650, and 655, respectively, and the outputs from the optical tap couplers 601 to 608 are fed to the eVOAs 620, 625, 630, 635, 640, 645, 650 and 655 respectively. The outputs from the eVOAs 620, 625, 630, 635, 640, 645, 650 and 655 are fed to another plurality of optical tap couplers 609 to 616 for detecting the optical signal power at the outputs of said eVOAs. The eVOAs 620, 625, 630, 635, 640, 645, 650 and 655 and optical tap couplers 601 to 616 are inserted in the path of incoming optical signals of a plurality of channels (wavelengths) 681 to 688. As described above with regard to the systems 300 and 500 of FIGS. 3 and 5 respectively, the optical tap couplers 601 to 616 are calibrated properly to accurately report the output signals powers 681 to 688, and the LOS power threshold is calibrated during commissioning of the installed optical system to meet the requirements of the optical network. The microcontroller 660 comprises a monitor signal processing controller 671, a scheduler 675, microprocessing controller 673 and a processor (control processing unit) 670. The microcontroller 660 further comprises a means for communications 6000 between the processor 670, the scheduler 675, the microprocessing controller 673, and the monitor signal processing controller 671. The outputs of the optical tap couplers 601 to 616 are coupled to the microcontroller 660 (the coupling not shown) to be processed by the monitor processing signal controller 671 for measuring the signal power at the input to and at the output of the eVOAs. The scheduler 675 provides precise timing for monitoring and controlling process for individual eVOA. The schedule 675 further comprises means for electronically cycling and scanning the eVOAs and checking their operating attenuations. The microprocessing controller 673 comprises means for determining, setting, adjusting and updating the eVOAs attenuations. The microcontroller 660 incorporates methods for controlling attenuation of multiple eVOAs that are processed by the processor 670. The output channels (wavelengths) 681 to 688 from the tap couplers 609 to 616 are then multiplexed by a multiplexer 695 to form the output WDM 690.

The method of operating the plurality of eVOAs in the system 600 of FIG. 6 is similar to that shown in FIG. 4 above, except for the measured power now being measured at both at the inputs 601 to 608 to the eVOAs #1 to #n and at the outputs 609 to 616 of the eVOAs #1 to #n respectively.

Figure 7:
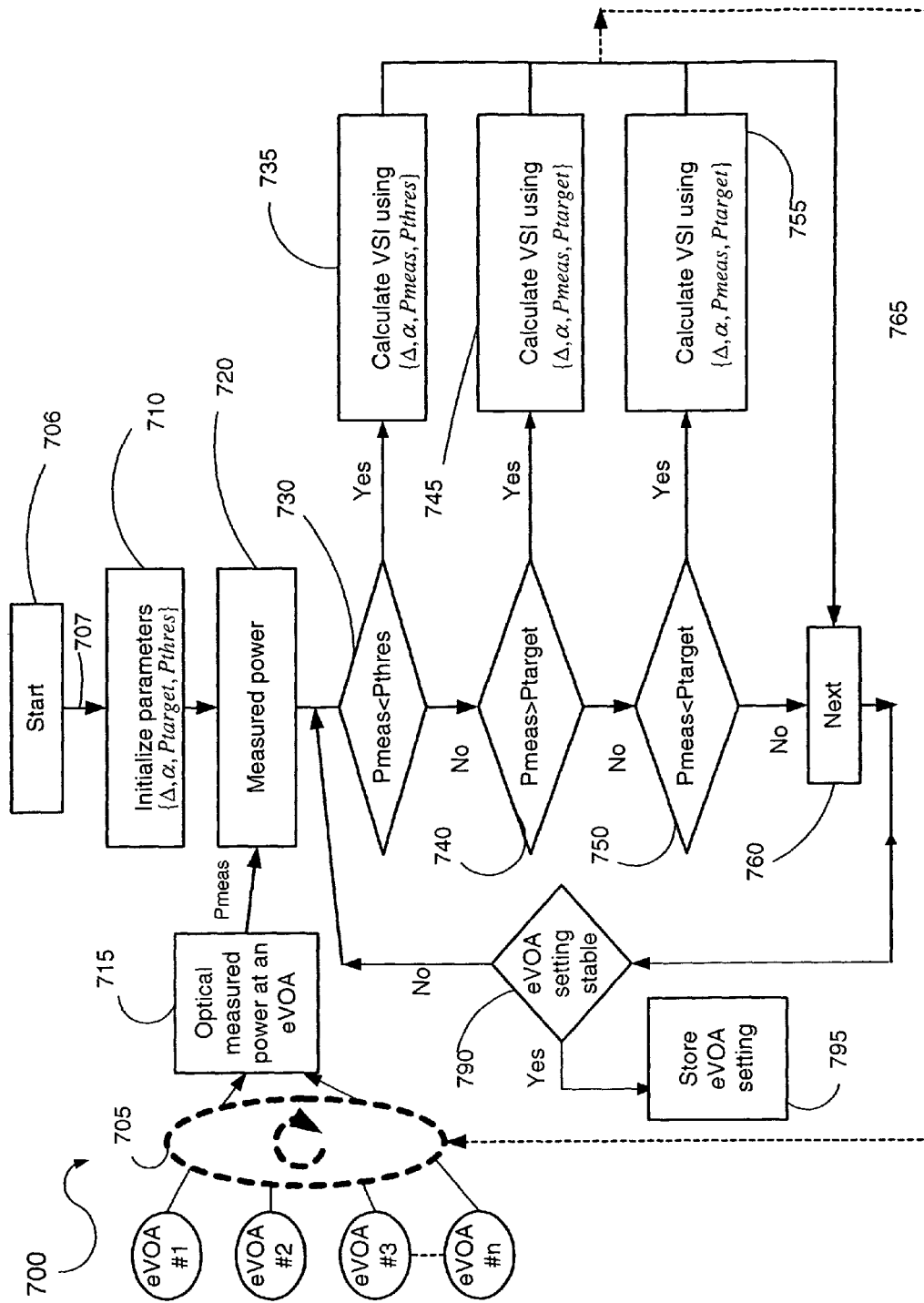
FIG. 7 is a flow chart diagram illustrating a method for operating a plurality of eVOAs in the systems of FIGS. 3, 5 and 6 in accordance with a second embodiment of this invention.

FIG. 7 shows a flow diagram 700 illustrating a method of operating a plurality of eVOAs in the systems of FIGS. 3, 5 and 6 according to the second embodiment of the invention. The procedure 700 scans through the multiple eVOAs #1 to #n (block 705) and controls one of the eVOAs at a time in the following manner. Upon Start up (block 706), routine 707 initializes parameters of the eVOAs (block 710), wherein the parameters comprise a pre-calibrated manufacturing insertion loss value $\Delta$, a network operating requirements factors $\alpha$, measured target power {Ptarget} and LOS power threshold {Pthres}. The scheduler (375, 575 or 675 in the respective systems 300, 500 and 600) electronically cycles the eVOAs and checks the eVOAs attenuations. This scanning is performed in a specified time period "T", wherein {T=n·$\tau$}, "T" is the controller response time, "n" is the number of eVOAs (n≧1), and $\tau$ is the time slice for actively controlling each eVOA. At each $\tau$, routine 707 uses actual measured power {Pmeas} (block 720) for at least one eVOA to determine the required variable size interval (VSI) for changing the eVOA attenuation. Routine 707 stores the initial parameters {$\Delta$, $\alpha$, Ptarget, Pthres, Pmeas} for each eVOA. If the optical signal power drops below a LOS power threshold {Pthres} (block 730), routine 707 computes a new VSI for changing the eVOA attenuation (block 735), the VSI being a function of the parameters {$\Delta$, $\alpha$, Pthres, Pmeas}, and continues to block 760, where the microprocessing controller (373, 573 or 673 in the systems 300, 500 and 600 respectively) sets the eVOA attenuation to the new VSI until optical power is restored. If eVOA attenuation setting is stable (block 790), routine 707 stores the VSI (block 795). Then the procedure 700, using the real time measured power {Pmeas} (block 715) and stored VSI, updates the eVOA attenuation by the stored VSI as signal power fluctuates. If the measured power {Pmeas} is greater than target power {Ptarget} (block 740), routine 707 computes the VSI for the eVOA attenuation (block 745), the VSI being a function of the parameters {$\Delta$, $\alpha$, Ptarget, Pmeas}, and continues to block 760, where the microprocessing controller adjusts the eVOA attenuation by the new VSI. If eVOA setting is stable (block 790), routine 707 stores the VSI value (block 795). If the measured power {Pmeas} is less than target power {Ptarget} (block 750), routine 707 computes the VSI for the eVOA attenuation (block 755), the VSI being a function of the parameters {$\Delta$, $\alpha$, Ptarget, Pmeas}, and continues to block 760, where the microprocessing controller adjusts the eVOA setting by the new VSI. If eVOA setting is stable (block 790), routine 707 stores the VSI value (block 795). The procedure described above is applied to each eVOA periodically (one e-VOA at a time), wherein the selection of the eVOA is illustrated by the dotted line 865 in FIG. 8.

The method for calculating the variable step intervals (VSI) for adjusting the attenuation in one or more VSI for each of the eVOAs #1 to #n may incorporate a linear function, a nonlinear function or a combination of linear and nonlinear functions of the eVOA attenuation setting parameters and network operating requirements, including a pre-calibrated manufacturing default insertion loss {$\Delta$} and a number of network operating requirements factors {$\alpha(i)$, wherein, i=1, 2, . . . , n} as described in detail in U.S. patent application Ser. No. 10/440,247 to Bierman, R. M., filed on 19 May 2003 and entitled "Method and Apparatus for Controlling a Variable Optical Attenuator in an Optical Network", and Canadian Patent Application Ser. No. 2,429,083 to Bierman, R. M., filed on 20 May 2003, also entitled "Method and Apparatus for Controlling a variable Optical Attenuator in an Optical Network", incorporated herein by reference.

Figure 8:
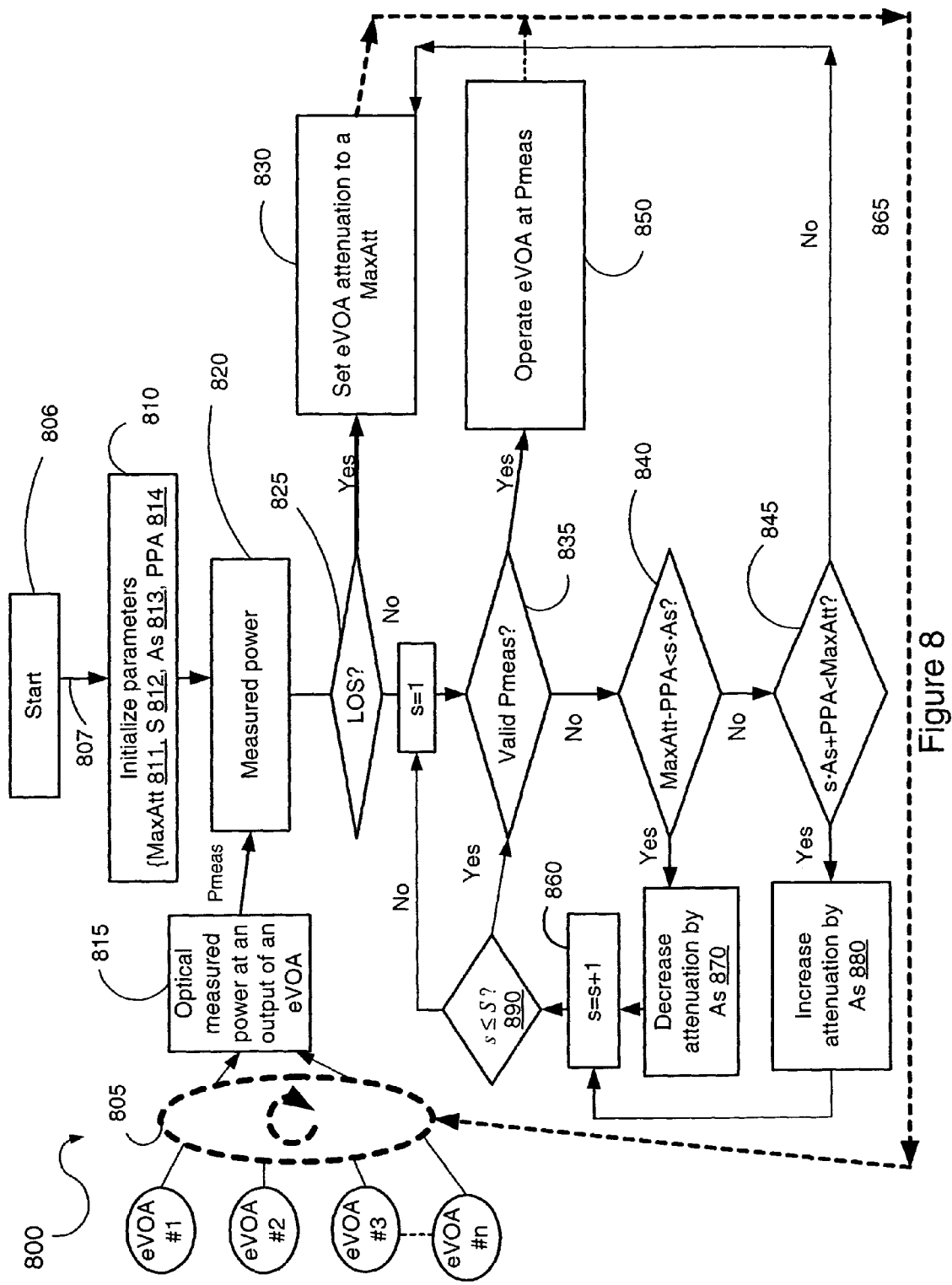
FIG. 8 is a flow chart diagram illustrating a method for operating a plurality of eVOAs for the system of FIG. 3 in accordance with a third embodiment of the invention.

FIG. 8 is a flow chart diagram 800 illustrating a method of operating a plurality of eVOAs for the system of FIG. 3 in accordance with the third embodiment of the invention. The normal operating attenuation of the eVOAs is monitored and stored by the monitor signal processing controller. The procedure 800 includes a method of operating an individual eVOA by modulating its attenuation, e.g. as described in a U.S. patent application to Scarth, G. B., et al, entitled "Method and Apparatus for Operating Variable Optical Attenuator by Modulating the Attenuation Thereof", filed concurrently herewith, which is incorporated herein by reference. The procedure 800 is stored on the microcontroller 860 and provides selection and control of one eVOA at a time, which is indicated by block 805 and a dotted line 865. Upon start up (block 806), routine 807 initializes parameters of eVOAs (block 810), wherein the parameters comprise an eVOA maximum attenuation (MaxAtt) 811, a number of steps for decreasing or increasing the eVOA attenuation, S 812, an attenuation value per step $A_s$ 813 and a pre-defined value for protection attenuation (PPA) 814. The scheduler 375 electronically cycles the eVOAs and time division multiplexes its control amongst the eVOAs circuits that it services. The scheduler 375 continuously cycles its control through each circuit within a time period, "T", wherein $\{T=n \cdot \tau\}$, "T" is the controller response time, "n" is the number of eVOAs ($n \geq 1$), and $\tau$ is the time slice for actively controlling each eVOA. At each $\tau$, routine 807 uses actual measured power {Pmeas} (block 820) at an output of an eVOA (block 815). If a loss-of-signal (LOS) condition is detected (block 825), routine 807 sets the eVOA operating attenuation to a maximum attenuation (MaxAtt 811) (block 830). If a valid measured power signal is detected (block 835), routine 807 operates the eVOA at the valid measured power (block 850), (that is normal control is restored); if no valid measured power signal is detected (block 835), routine 807 decreases the eVOA attenuation (block 870) by As 813, increases the number of steps by one (block 860), and checks for a valid measured power signal (block 835). If no valid measured power signal is detected and the maximum defined number of steps S 812 is reached, provided that $\{MaxAtt-PPA \geq S \cdot A_s\}$ (block 840), routine 807 increases the eVOA attenuation (block 880) by $A_s$ 813 and checks again for a valid measured power signal (block 835). If no valid measured power signal is detected (block 835) and $\{S \cdot A_s + PPA \geq MaxAtt\}$ (block 845), routine 807 resets the eVOA attenuation to the maximum attenuation (MaxAtt 811) (block 830). Periodically, the attenuation is reduced or increased in steps for short intervals of time to minimize the risk of a high-power transient being introduced to downstream optical components.

Figure 9:
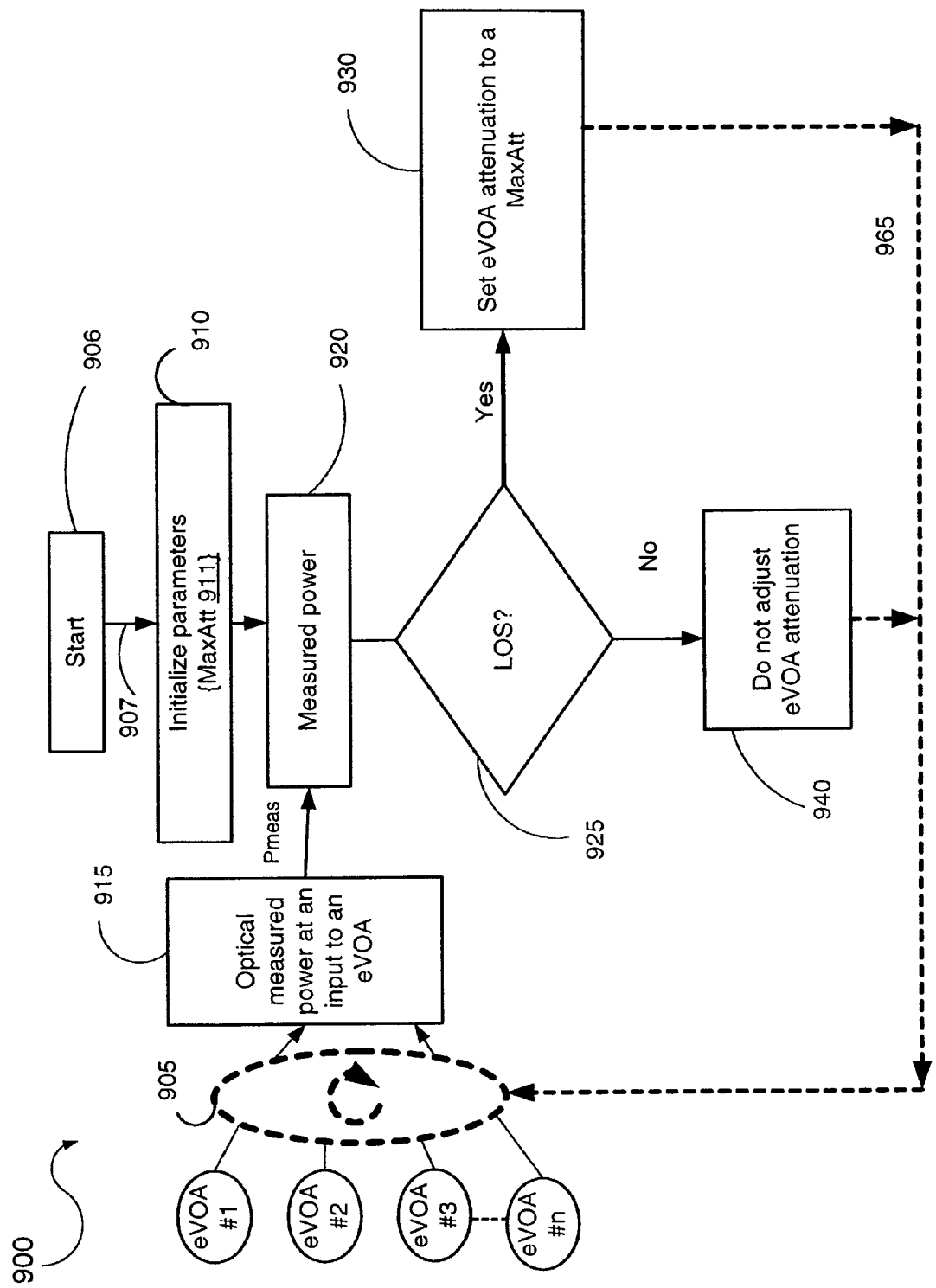
FIG. 9 is a flow chart diagram illustrating yet another method for operating a plurality of eVOAs for the systems of FIGS. 5 and 6 in accordance with a fourth embodiment of this invention.

FIG. 9 shows a flow chart diagram 900 illustrating yet another method for operating a plurality of eVOAs for the systems of FIGS. 5 and 6 in accordance with the fourth embodiment of the invention. The normal operating attenuation of each eVOA is monitored and stored by the monitor signal processing controller (571 and 671 in the systems 500 and 600 respectively). The procedure 900 includes the method of operating an individual eVOA by modulating its attenuation, e.g. as described in a U.S. patent application to Scarth, G. B., et al, entitled "Method and Apparatus for Operating Variable Optical Attenuator by Modulating the Attenuation Thereof", filed concurrently herewith, which is incorporated herein by reference. The procedure 900 is incorporated on the microcontroller 960 and provides selection and control of one eVOA at a time as indicated by block 905 and dotted line 965 in FIG. 9. Upon start up (block 906), routine 907 initializes the parameters of the eVOAs (block 910). The parameters comprise an eVOA maximum attenuation (MaxAtt) 911. The monitor signal processing controller (571 and 671 in the systems 500 and 600 respectively) actively monitors one eVOA circuit at-a-time (block 905) with the aid of the scheduler (575 and 675 in the systems 500 and 600 respectively), which electronically cycles the eVOAs and time division multiplexes its control amongst the eVOAs circuits that it services. The scheduler (575, 675) continuously cycles its control through each circuit within a time period, "T", wherein $\{T=n \cdot \tau\}$, "T" is the controller response time, "n" is the number of eVOAs ($n \geq 2$), and $\tau$ is the time slice for actively controlling each eVOA. At each $\tau$, routine 907 uses actual measured power {Pmeas} (block 920) at an input to an eVOA (block 915). If a loss-of-signal (LOS) is detected (block 925), routine 907 sets the eVOA operating attenuation to a maximum attenuation (MaxAtt 911) (block 930). If no loss-of-signal (LOS) is detected (block 925), routine 907 operates the eVOA at the valid measured power (block 940), (that is normal control is restored). The microcontroller cycles through the eVOAs #1 to #n (block 905), monitoring and adjusting each eVOA as required. When the microcontroller returns its attention to the channel with a LOS condition, it checks for a loss-of-signal (LOS) condition (block 925). The microcontroller then proceeds to the next eVOA (block 905).

Thus, the methods of operating a plurality of eVOAs and corresponding systems incorporating respective microcontrollers for controlling multiple eVOAs are provided.

The optical systems of FIGS. 3, 5 and 6 have lower initial installation costs and provide space saving and power consumption reduction due to utilizing a single and improved microcontroller for monitoring and controlling a plurality of eVOAs. For the systems of FIGS. 3 and 5, the costs are further minimized by providing only a single optical tap coupler for each eVOA located either after or before an eVOA. Corresponding methods of operating the plurality of eVOAs provide additional advantages of reducing or eliminating risks of power spikes in WDM networks and/or speedy recovery of LOS condition and fast response time of the eVOAs to optical signal power fluctuations in the WDM network.

Appreciably, by incorporating the methods described above, various strategies may be employed in controlling individual eVOA attenuation to achieve the optical signal power requirements in a WDM network. Some eVOAs in the plurality of eVOAs may be controlled by the method of the first embodiment, wherein the eVOA attenuation is set at a pre-determined attenuation, which is less than the minimum attenuation of the eVOA. Other eVOAs in the plurality of eVOAs may be controlled by the method of the third embodiment, wherein the attenuation is adjusted by variable size intervals (VSI) whenever the measured optical signal power is below a LOS power threshold and whenever changes in the signal power is higher and lower than a target power. Yet some other eVOAs in the plurality of eVOAs may be controlled by the method(s) of the third and/or fourth embodiments, wherein the attenuation is adjusted by small and finite steps whenever a LOS condition is detected, or any other method suitable for controlling individual eVOAs.

The plurality of the eVOAs may be cycled by the microcontroller in a random or a prescribed order depending on the system requirements.

It will be apparent to those with skill in the art that modifications to the above methods and embodiments can occur without deviating from the scope of the present invention. Accordingly, the disclosures and descriptions herein are intended to be illustrative, but not limiting, of the scope of the invention which is set forth in the following claims.

What is claimed is:

1. A method for operating a plurality of eVOAs connected to a microcontroller inserted in optical paths of optical signals propagating in an optical network, comprising the steps of:
   (a) selecting an eVOA from the plurality of eVOAs;
   (b) operating the selected eVOA according to a predetermined method of controlling said eVOA within a time slice allocated for the selected eVOA; and
   (c) repeating the steps (a) to (b) until all eVOAs from the plurality of the eVOAs have been selected; and
   (d) repeating the steps (a) to (c) as required, wherein the step (b) of operating the selected eVOA comprises:
   measuring the optical signal power at the output of the selected eVOA; and
   setting the attenuation of the selected eVOA to a substantially maximum attenuation (MaxAtt) and modulating the attenuation said eVOA by decreasing and increasing the eVOA attenuation in finite steps until the optical power is detected above the LOS power threshold or the maximum attenuation (MaxAtt) is reached.

2. A method described in claim 1, wherein the step of selecting the eVOA comprises continuously cycling through the eVOA in a specified time period "$\tau$", wherein $T=n\cdot\tau$, "n" is the number of eVOAs, $\tau$ is the time slice for controlling each eVOA; and
   further comprises taking time "$T_s$" for each finite step such that $S*T_s<T$, wherein "S" is the maximum number of finite steps.

3. A method described in claim 2, wherein the step of modulating the eVOA attenuation in finite steps comprises determining a maximum number of steps "S" for decreasing and increasing the attenuation, an attenuation value per step "$A_s$", and a predefined protection attenuation (PPA).

4. A method as described in claim 3, wherein the step of modulating the eVOA attenuation in finite steps further comprises:
   selecting a stepping down step size for decreasing the eVOA attenuation by $A_s$ such that $\{MaxAtt-PPA\}<S\cdot A_s$; and
   selecting a stepping up step size for increasing the eVOA attenuation by $A_s$ such that $\{S\cdot A_s+PPA\}<MaxAtt$.

5. A method as described in claim 1, wherein the step (a) of selecting the eVOA from the plurality of eVOAs comprises cycling through the eVOA in a random order.

6. A system for operating a plurality of electronic variable optical attenuators (eVOAs) connected to a microcontroller inserted in optical paths of optical signals propagating in an optical network, the system comprising:
   (a) means for selecting one eVOA from the plurality of eVOAs at a time;
   (b) means for operating the selected eVOA according to a predetermined method of controlling the selected eVOA within a time slice allocated for the selected eVOA;
   (c) means for repeating the steps (a) to (b) until all eVOAs from the plurality of the eVOAs have been selected; and
   (d) means for repeating the steps (a) to (c) as required, wherein the means for selecting and operating further comprises:
   a scheduler having a clock for generating the allocated time slice $\{\tau\}$ for monitoring and controlling the selected eVOA;
   a processor for calculating the attenuation of the selected eVOA according to the predetermined method of controlling the selected eVOA during the allocated time slice;
   a monitor signal processing controller for measuring power of an optical signal at the selected eVOA;
   a microprocessing controller for changing an operating attenuation of the selected eVOA in response to a signal received from the processor; and
   a means for providing communications between the processor, the monitor signal processing controller, the scheduler and the microprocessing controller, and
   wherein the means for operating further comprises a means for measuring the optical signal power at the output of the selected eVOA; and setting the attenuation of the selected eVOA to a substantially maximum attenuation (MaxAtt) and modulating the attenuation said eVOA by decreasing and increasing the eVOA attenuation in finite steps until the optical power is detected above the LOS power threshold or the maximum attenuation (MaxAtt) is reached.

7. A system as described in claim 6, wherein the means for selecting the eVOA comprises continuously cycling through the eVOA in a specified time period "$\tau$", wherein $T=n\cdot\tau$, "n" is the number of eVOAs, $\tau$ is the time slice for controlling each eVOA; and
   further comprises taking time "$T_s$" for each finite step such that $S*T_s<T$, wherein "S" is the maximum number of finite steps.

8. A system as described in claim 7, wherein the means for modulating the eVOA attenuation in finite steps comprises determining a maximum number of steps "S" for decreasing and increasing the attenuation, an attenuation value per step "$A_s$", and a predefined protection attenuation (PPA).

9. A system as described in claim 8, wherein the step of modulating the eVOA attenuation in finite steps further comprises:
   selecting a stepping down step size for decreasing the eVOA attenuation by $A_s$ such that $\{MaxAtt-PPA\}<S\cdot A_s$; and
   selecting a stepping up step size for increasing the eVOA attenuation by $A_s$ such that $\{S\cdot A_s+PPA\}<MaxAtt$.

10. A system as described in claim 6, wherein the means for selecting the eVOA from the plurality of eVOAs comprises means cycling through the eVOAs in a random order.

* * * * *